US009075835B2

(12) United States Patent
Okano (10) Patent No.: US 9,075,835 B2
(45) Date of Patent: Jul. 7, 2015

(54) LEARNING SUPPORT DEVICE, LEARNING SUPPORT METHOD AND STORAGE MEDIUM IN WHICH LEARNING SUPPORT PROGRAM IS STORED

(71) Applicant: CASIO COMPUTER CO. LTD., Tokyo (JP)

(72) Inventor: Mitsuru Okano, Akiruno (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 200 days.

(21) Appl. No.: 13/846,435

(22) Filed: Mar. 18, 2013

(65) Prior Publication Data

US 2013/0246380 A1    Sep. 19, 2013

(30) Foreign Application Priority Data

Mar. 19, 2012  (JP) ................................. 2012-061708
Sep. 10, 2012  (JP) ................................. 2012-198117

(51) Int. Cl.
| G09B 7/00 | (2006.01) |
| G06F 17/30 | (2006.01) |
| G09B 19/02 | (2006.01) |
| G09B 7/02 | (2006.01) |

(52) U.S. Cl.
CPC ........ G06F 17/30312 (2013.01); G09B 19/025 (2013.01); G09B 7/02 (2013.01)

(58) Field of Classification Search
USPC ........................... 434/322, 118, 188; 707/705
See application file for complete search history.

(56) References Cited

U.S. PATENT DOCUMENTS

| 6,011,949 A * | 1/2000 | Shimomukai ................. 434/358 |
| 8,714,981 B2 * | 5/2014 | Herman et al. ............... 434/118 |
| 2007/0298389 A1 * | 12/2007 | Yu et al. ........................ 434/188 |

FOREIGN PATENT DOCUMENTS

| CN | 102169644 A | 8/2011 |
| JP | 2004-093915 A | 3/2004 |

OTHER PUBLICATIONS

Algebrator Manual,http://www.softmatch.com/algman.htm, Feb. 7, 2003.*
Extended European Search Report dated Aug. 7, 2013, (in English) in counterpart European Application No. 13159920.1.
European Office Action dated Sep. 2, 2014 issued in counterpart European Application No. 13 159 920.1.
Chinese Office Action dated Dec. 31, 2014, issued in counterpart Chinese Application No. 201310185109.2.

* cited by examiner

*Primary Examiner* — Hung T Vy
(74) *Attorney, Agent, or Firm* — Holtz, Holtz, Goodman & Chick PC (57) ABSTRACT

Provided is a learning support device that supports a user to solve a problem for which an explanation is not stored by referring to an explanation stored for another problem. A student terminal includes a storage unit in which example problems each including a problem and an explanation and exercises are stored; an input unit which designates any one of the exercises as a designated exercise based on a user's operation; a CPU which detects, from the example problems stored in the storage unit, an example problem having a problem similar to the designated exercise as a reference example problem; and a display unit which displays an explanation for the reference example problem and displays a portion in the explanation that corresponds to a difference portion between the problem of the reference example problem and the designated exercise in a discriminative manner.

7 Claims, 8 Drawing Sheets

| POSITIONAL INFORMATION | TEACHING MATERIAL TEXT |
|---|---|
| | ● SUBSTITUTION METHOD |
| P34L17 | (EXAMPLE 1) SOLVE THE FOLLOWING SYSTEM OF EQUATIONS $$\begin{cases} y = x - 1 & [1] \\ x + y = 5 & [2] \end{cases}$$ APPROACH TO THE PROBLEM  REPLACE y IN EQUATION [2] BY x − 1 SINCE y IS EQUAL TO x − 1 IN [1]. NAMELY, SUBSTITUTE x − 1 FOR y TO ELIMINATE y<br><br>SOLUTION  SUBSTITUTE [1] IN [2] $$x + (x - 1) = 5$$ SOLVE THE EQUATION  $x = 3$  ANSWER $\begin{cases} x = 3 \\ y = 2 \end{cases}$<br>SUBSTITUTE THIS IN [1]  $y = 2$ |
| | ● LINEAR COMBINATION METHOD |
| P34L17 | (EXAMPLE 2) SOLVE THE FOLLOWING SYSTEM OF EQUATIONS $$\begin{cases} 2x - 3y = -7 & [1] \\ 3x + 2y = -4 & [2] \end{cases}$$ APPROACH TO THE PROBLEM<br>IN ORDER TO MATCH THE COEFFICIENT OF y IN [1] AND [2], MULTIPLY BOTH SIDES OF [1] BY 2, MULTIPLY BOTH SIDES OF [2] BY 3, ADD/SUBTRACT [1] AND [2], AND ELIMINATE y<br><br>[1]×2   $4x - 6y = -14$<br>[2]×3  +) $9x + 6y = -12$<br>        $13x = -26$<br>        $x = -2$<br><br>SUBSTITUTE THIS IN [2]          ANSWER $\begin{cases} x = -2 \\ y = 1 \end{cases}$<br>$3 \times (-2) + 2y = -4$  $y = 1$ |
| | (END OF CHAPTER PROBLEMS) |
| P41L2 | QUESTION 1  SOLVE THE FOLLOWING SYSTEM OF EQUATIONS<br>(1) $\begin{cases} 5x + 7y = -16 \\ 2x + 5y = -2 \end{cases}$  (2) $\begin{cases} y = 3x - 7 \\ 2x + 5y = 9 \end{cases}$ |
| P41L6 | QUESTION 2  FILL IN THE ☐ SO THAT THE FOLLOWING PAIR OF VALUES WOULD BE THE SOLUTION TO THE LINEAR EQUATION WITH TWO UNKNOWNS $2x - y = 8$<br>(1) $\begin{cases} x = 0 \\ y = \square \end{cases}$  (2) $\begin{cases} x = 5 \\ y = \square \end{cases}$ |

[TEACHING MATERIAL] NEW MATHEMATICS 2 (○○ PUBLISHER)　　P41

(END OF CHAPTER PROBLEMS)

QUESTION 1　SOLVE THE FOLLOWING SYSTEM OF EQUATIONS (1) $\begin{cases} 5x + 7y = -16 & [1] \\ x + 5y = -2 & [2] \end{cases}$　　(2) $\begin{cases} y = 3x - 7 & [1] \\ 2x + 5y = 9 & [2] \end{cases}$

DISPLAY HINT

[NOTE] MATHEMATICS GRADE 2　02/26/2012　　P22

REFER TO (EXAMPLE 2) ON P34

SOLVE THE FOLLOWING SYSTEM OF EQUATIONS
$\begin{cases} 2x - 3y = -7 & [1] \\ 3x + 2y = -4 & [2] \end{cases}$

FIG.5B

[TEACHING MATERIAL] NEW MATHEMATICS 2 (○○ PUBLISHER)　　P41

(END OF CHAPTER PROBLEMS)

QUESTION 1　SOLVE THE FOLLOWING SYSTEM OF EQUATIONS (1) $\begin{cases} 5x + \boxed{7}y = -16 & [1] \\ x + \boxed{5}y = -2 & [2] \end{cases}$　　(2) $\begin{cases} y = 3x - 7 & [1] \\ 2x + 5y = 9 & [2] \end{cases}$

DISPLAY HINT

[NOTE] MATHEMATICS GRADE 2　02/26/2012　　P22

REFER TO (EXAMPLE 2) ON P34

APPROACH TO THE PROBLEM:
IN ORDER TO MATCH THE COEFFICIENT OF y IN [1] AND [2],
MULTIPLY BOTH SIDES OF [1] BY 2, MULTIPLY BOTH SIDES OF [2] BY 3.
ADD/SUBTRACT [1] AND [2], AND ELIMINATE y.
[1] × 2

SOLVE THE FOLLOWING SYSTEM OF EQUATIONS
$\begin{cases} 2x - \boxed{3}y = -7 & [1] \\ 3x + \boxed{2}y = -4 & [2] \end{cases}$

FIG.6A

[TEACHING MATERIAL] NEW MATHEMATICS 2 (○○ PUBLISHER)   P41

(END OF CHAPTER PROBLEMS)

QUESTION 1  SOLVE THE FOLLOWING SYSTEM OF EQUATIONS (1) $\begin{cases} 5x + 7y = -16 & [1] \\ x + 5y = -2 & [2] \end{cases}$ (2) $\begin{cases} y = 3x - 7 & [1] \\ 2x + 5y = 9 & [2] \end{cases}$

DISPLAY HINT

— W2

[NOTE] MATHEMATICS GRADE 2 | 02/26/2012   P22

REFER TO (EXAMPLE 2) ON P34

APPROACH TO THE PROBLEM
IN ORDER TO MATCH THE COEFFICIENT OF y IN [1] AND [2],
MULTIPLY BOTH SIDES OF [1] BY 2 MULTIPLY BOTH SIDES OF [2] BY 3
ADD/SUBTRACT [1] AND [2], AND ELIMINATE y

SOLVE THE FOLLOWING SYSTEM OF EQUATIONS
$\begin{cases} 2x - 3y = -7 & [1] \\ 3x + 2y = -4 & [2] \end{cases}$

[TEACHING MATERIAL] NEW MATHEMATICS 2 (○○ PUBLISHER)   P41

(END OF CHAPTER PROBLEMS)

QUESTION 1  SOLVE THE FOLLOWING SYSTEM OF EQUATIONS (1) $\begin{cases} 5x + 7y = -16 & [1] \\ x + 5y = -2 & [2] \end{cases}$ (2) $\begin{cases} y = 3x - 7 & [1] \\ 2x + 5y = 9 & [2] \end{cases}$

DISPLAY HINT

— W2

[NOTE] MATHEMATICS GRADE 2 | 02/26/2012   P22

REFER TO (EXAMPLE 2) ON P34

APPROACH TO THE PROBLEM
IN ORDER TO MATCH THE COEFFICIENT OF y IN [1] AND [2],
MULTIPLY BOTH SIDES OF [1] BY 2 MULTIPLY BOTH SIDES OF [2] BY 3
ADD/SUBTRACT [1] AND [2], AND ELIMINATE y

SOLVE THE FOLLOWING SYSTEM OF EQUATIONS
$\begin{cases} 2x - 3y = -7 & [1] \\ 3x + 2y = -4 & [2] \end{cases}$

[1] ×5   $25x + 35y = -80$
[2] ×7 −) $14x + 35y = -14$
              $11x \phantom{+ 35y} = -66$
                    $x = -6$
$2 \times (-6) + 5y = -2$    $5y = -2 + 12$   $y = 2$

[TEACHING MATERIAL] NEW MATHEMATICS 2 (○○ PUBLISHER)   P41

QUESTION 2   FILL IN THE □ SO THAT THE FOLLOWING PAIR OF VALUES WOULD BE THE SOLUTION TO THE LINEAR EQUATION WITH TWO UNKNOWNS $2x - y = 8$ (1) $\{ x = 0$   [1]    (2) $\{ x = 5$   [1]
   DISPLAY HINT   [2]      $y = □$   [2]

NO REFERENCE EXAMPLE PROBLEM CAN BE FOUND

[NOTE] MATHEMATICS GRADE 2   02/26/2012   P22

APPROACH TO THE PROBLEM
SUBSTITUTE x = '0' IN THE LINEAR EQUATION WITH TWO UNKNOWNS
$2 \times 0 - y = 8$    ANSWER $y = -8$

FIG.7B

[TEACHING MATERIAL] NEW MATHEMATICS 2 (○○ PUBLISHER)   P41

QUESTION 2   FILL IN THE □ SO THAT THE FOLLOWING PAIR OF VALUES WOULD BE THE SOLUTION TO THE LINEAR EQUATION WITH TWO UNKNOWNS $2x - y = 8$ (1) $\{ x = 0$   [1]    (2) $\{ x = 5$   [1]
   DISPLAY HINT   [2]      $y = □$   [2]

[NOTE] MATHEMATICS GRADE 2   02/26/2012   P22

REFER TO MEMO FOR THE PROBLEM
APPROACH TO THE PROBLEM
SUBSTITUTE x = 0 IN THE LINEAR EQUATION WITH TWO UNKNOWNS

FIG.7C

[TEACHING MATERIAL] NEW MATHEMATICS 2 (○○ PUBLISHER)   P41

QUESTION 2   FILL IN THE □ SO THAT THE FOLLOWING PAIR OF VALUES WOULD BE THE SOLUTION TO THE LINEAR EQUATION WITH TWO UNKNOWNS $2x - y = 8$ (1) $\{ x = 0$   [1]    (2) $\{ x = 5$   [1]
    $y = □$   [2]      DISPLAY HINT   [2]

[NOTE] MATHEMATICS GRADE 2   02/26/2012   P22

REFER TO QUESTION 2 (1) ON P41
APPROACH TO THE PROBLEM
SUBSTITUTE x = 0 IN THE LINEAR EQUATION WITH TWO UNKNOWNS $\{ x = 0$   [1]
$\{ y = □$   [2]

FIG.8

[TEACHING MATERIAL] NEW MATHEMATICS 2 (OO PUBLISHER)   P41

(END OF CHAPTER PROBLEMS)

QUESTION 1   SOLVE THE FOLLOWING SYSTEM OF EQUATIONS BY THE LINEAR COMBINATION METHOD (1) $\begin{cases} 5x + 7y = -16 & [1] \\ 2x + 5y = -2 & [2] \end{cases}$   (2) $\begin{cases} y = 3x - 7 & [1] \\ 2x + 5y = 9 & [2] \end{cases}$

DISPLAY HINT

[NOTE] MATHEMATICS GRADE 2  02/26/2012   P22

REFER TO (EXAMPLE 2) ON P34

APPROACH TO THE PROBLEM

ELIMINATE y BY THE LINEAR COMBINATION METHOD.
IN ORDER TO MATCH THE COEFFICIENT OF y IN [1] AND [2]
MULTIPLY BOTH SIDES OF [1] BY 2, MULTIPLY BOTH SIDES OF [2] BY 3.
ADD/SUBTRACT [1] AND [2], AND ELIMINATE y.

[1] × 2

SOLVE THE FOLLOWING SYSTEM OF EQUATIONS BY THE LINEAR COMBINATION METHOD $\begin{cases} 2x - 3y = -7 & [1] \\ 3x + 2y = -4 & [2] \end{cases}$

LEARNING SUPPORT DEVICE, LEARNING SUPPORT METHOD AND STORAGE MEDIUM IN WHICH LEARNING SUPPORT PROGRAM IS STORED

CROSS-REFERENCE TO RELATED APPLICATIONS

This application is based upon and claims the benefit of priority from the prior Japanese Patent Applications No. 2012-061708, filed Mar. 19, 2012 and No. 2012-198117, filed Sep. 10, 2012, and the entire contents of which are incorporated herein by reference.

BACKGROUND OF THE INVENTION

1. Field of the Invention

The present invention relates to a learning support device, a learning support method, and a storage medium in which a learning support program is stored.

2. Description of the Related Art

A conventional learning support device such as a tablet personal computer used for student learning has been proposed, in which an explanation such as a solution to a problem such as a mathematical example problem is stored beforehand for each step and displayed one by one for a student (refer to JP 2001-93915 A, for example).

In the technology described in JP 2004-93915 A, however, an explanatory text for each problem needs to be created and stored beforehand for each step, thereby causing a great burden of preparation. Considering this point, the step-by-step explanation can be stored for an example problem or the like only. In this case, however, the learning effect would be degraded because a user cannot refer to an explanation for a problem for which the explanation is not stored while the user can solve the problem by referring to the explanation for a problem for which an explanation is stored.

SUMMARY OF THE INVENTION

An objective of the present invention is to provide a learning support device, a learning support method, and a storage medium storing therein a learning support program, which enable a user to solve a problem, for which no explanation is stored, by referring to an explanation stored for another problem.

In order to achieve the objective, according to an aspect of the present invention, there is provided a learning support device including an example problem storage means (unit) in which a plurality of example problems, each including a problem and an explanation, are stored; an exercise storage means (unit) in which a plurality of exercises are stored; an exercise designation means (unit) which designates any one of the exercises as a designated exercise based on a user's operation; a similar example problem judging means (unit) which judges whether there is an example problem having a problem similar to the designated exercise in the example problem storage unit; and an example problem corresponding portion discriminating and displaying means (unit) which displays an explanation for a reference example, problem, which is an example problem having the similar problem, and displays a portion in the explanation corresponding to a difference portion or an equivalent portion between the problem of the reference example problem and the designated exercise in a discriminative manner, when judged by the similar example problem judging unit that there is the example problem having the similar problem to the designated exercise.

According to the present invention, a user can solve a problem, for which no explanation is stored, by referring to an explanation stored for another problem.

BRIEF DESCRIPTION OF THE DRAWINGS

FIG. 2 is a diagram illustrating an example of teaching material data;

FIGS. 7A to 7C are diagrams illustrating display content on the display; and

DESCRIPTION OF THE PREFERRED EMBODIMENTS

An example of an embodiment according to the present invention will be described in detail with reference to the attached drawings. However, the scope of the invention is not limited by the examples shown in the figures.

[Configuration]

Figure 1:
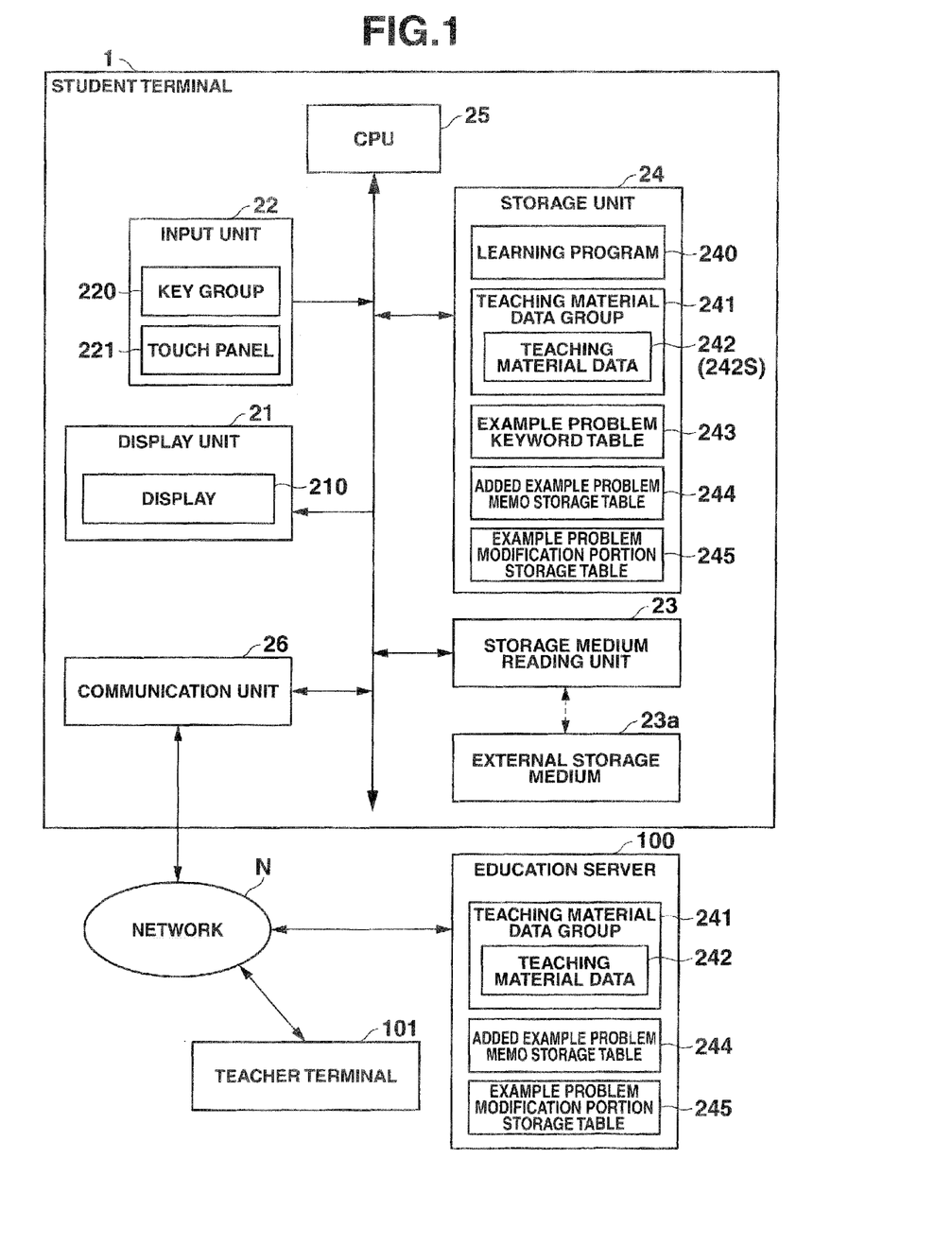
FIG. 1 is a block diagram illustrating a functional configuration of a student terminal.

FIG. 1 is a block diagram illustrating a schematic configuration of a student terminal 1 of an embodiment.

As illustrated in FIG. 1, the student terminal 1 of an embodiment is a tablet personal computer used by a school student and includes a display unit 21, an input unit 22, a storage medium reading unit 23, a communication unit 26, a storage unit 24, a CPU 25 and the like.

The display unit 21 includes a display 210 on which a variety of information is displayed on the basis of a display signal input from the CPU 25. The display 210 in an embodiment is formed integrally with what is called a touch panel 221 to be able to accept a touch operation by a user.

The input unit 22 includes a key group 220 and the touch panel 221 and is adapted to output to the CPU 25 a signal corresponding to a pressed key type or a position on the touch panel 221.

The storage medium reading unit 23 is adapted to read information from an external storage medium 23a such as an SD card and record information in the external storage medium 23a.

Teaching material data 242 or the like is stored in the external storage medium 23a and has the same data structure as teaching material data 242 in the storage unit 24 to be described later. The description of the teaching material data 242 will not thus be given at this point.

The communication unit 26 can be connected to a network N and can therefore communicate with an external device connected to the network N.

The storage unit 24 stores therein a program and data for realizing a variety of functions of the student terminal 1 and also serves as a memory to function as a work area for the CPU 25. In an embodiment, the storage unit 24 stores therein a learning program 240 according to the present invention, a teaching material data group 241; an example problem keyword table 243, an added example problem memo storage table 244, an example problem modification portion storage table 245 and the like.

The learning program 240 is provided to allow the CPU 25 to execute a learning support process (refer to FIG. 3) to be described later.

The teaching material data group 241 has a plurality of the teaching material data 242. As illustrated in FIG. 2, for example, the teaching material data 242 includes therein a plurality of example problems each having a problem and an explanation (refer to "Example 1" and "Example 2" in the figure), and a plurality of exercises each similar to the problem in the example problem (refer to "Question 1 (1)" and the like in the figure). In an embodiment, an explanatory text for an example problem is divided into a plurality of steps by a line break symbol or the like. The teaching material data 242 is downloaded by the learning support process (refer to FIG. 3) to be described later.

The example problem keyword table 243 stores therein a plurality of keywords (hereinafter referred to as an example problem keyword) for detecting an example problem in the teaching material data 242. The example problem keyword in an embodiment includes keywords such as an "example", an "example problem", a "problem" and a "formula".

When a user has input an explanatory memo for an exercise (practice problem) in the learning support process (refer to FIG. 3) to be described later, the added example problem memo storage table 244 accumulates and stores the information on the exercise and the explanatory memo, in the added example problem memo storage table 244, associated as information on a problem and an explanation for an example problem that has been added (hereinafter referred to as an added example problem). Specifically, the added example problem memo storage table 244 stores therein, as the information on the exercise (the added example problem), a name of the teaching material data 242 including the exercise, a page number of the exercise and an exercise number (such as "Question 2 (1)") in the teaching material data 242. In an embodiment, a text of the explanatory memo is divided into multiple steps by the line break symbol or the like.

The example problem modification portion storage table 245 cumulatively stores information on a portion to be modified in an explanation for an example problem (hereinafter referred to as a portion to be modified) when the explanation is applied to an exercise as a reference. In an embodiment, the example problem modification portion storage table 245 stores therein, as the information on the portion to be modified, a name of the teaching material data 242 including the portion to be modified, a page number for the portion to be modified and an example problem number (such as "Question 2 (1)") in the teaching material data 242, positional information on the portion to be modified in the explanation for the example problem and the like. The portion to be modified in the explanation is a numerical portion in the explanation having the numerical value identical to that in the example problem. Moreover, the portion to be modified can be arbitrarily set by a user within the explanation for the example problem.

The CPU 25 performs central control on each part of the student terminal 1. Specifically, the CPU 25 extracts and develops a designated program from among a system program and various application programs stored in the storage unit 24 and executes various processes in cooperation with the developed program.

The student terminal 1 is connected to an education server 100 and a teacher terminal 101 via the network N.

The education server 100 stores therein a teaching material data group 241, an added example problem memo storage table 244, and an example problem modification portion storage table 245. The description will not be given here for the teaching material data group 241, the added example problem memo storage table 244, and the example problem modification portion storage table 245 because they have the same data structure as that of the teaching material data group 241, the added example problem memo storage table 244, and the example problem modification portion storage table 245 in the student terminal 1.

The teacher terminal 101 is a tablet personal computer used by a school teacher and has the same configuration as that of the student terminal 1. The description of the teacher terminal 101 will not thus be given at this point.

[Learning Support Process]

Now, the learning support process executed by the student terminal 1 and the teacher terminal 101 will be described with reference to FIG. 3.

Figure 3:
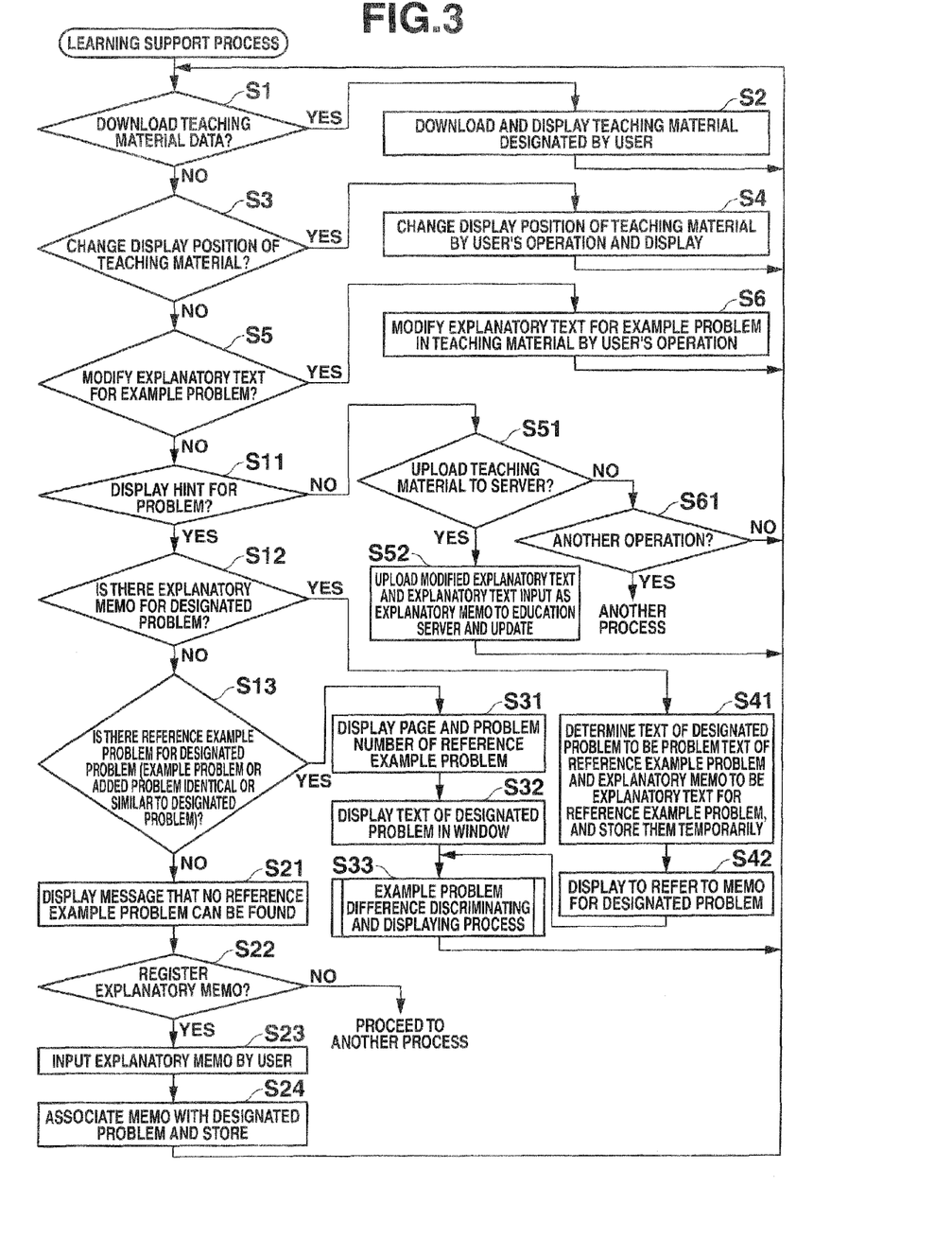
FIG. 3 is a flowchart illustrating a flow of a learning support process.

FIG. 3 is a flowchart for describing an operation in the learning support process. Once an instruction for executing the learning support process has been input by a user via the input unit 22, the learning support process is executed cooperatively by the learning program 240 and the CPU after the learning program 240 is read from the storage unit 24 and developed appropriately.

As illustrated in FIG. 3, in the learning support process, the CPU 25 first decides whether or not an operation for instructing a download of the teaching material, data 242 is performed (step S1).

When it was decided in step S1 that the operation for instructing the download of the teaching material data 242 was performed (step S1; Yes), the CPU 25 performs control so that any one of the teaching material data 242 designated by a user operation (hereinafter referred to as designated teaching material data 242S) among the teaching material data 242 in the education server 100 is downloaded from the education server 100 by the communication unit 25, stored in the storage unit 24, and displayed on the display 210 (step S2). The process thereafter proceeds back to step S1. In step S2, when information on the designated teaching material data 242S is stored in the added example problem memo storage table 244 and the example problem modification portion storage table 245 in the education server 100, the CPU 25 downloads the information to be additionally stored in the added example problem memo storage table 244 and the example problem modification portion storage table 245 in the student terminal 1.

When it was decided in step S1 that the operation for instructing the download of the teaching material data 242 is not performed (step S1; No), the CPU 25 decides whether or not an operation for changing a display position of the designated teaching material data 242S is performed (step S3).

When it was decided in step S3 that the operation for changing the display position was performed (step S3; Yes), the CPU 25 updates the display content of the designated teaching material data 242S by changing the display position (page or line) thereof in accordance with the user operation (step S4) and proceeds back to step S1.

When it was decided in step S3 that the operation for changing the display position is not performed (step S3; No), the CPU 25 decides whether or not an operation for modifying an explanation for an example problem is performed (step S5).

When it was decided in step S5 that the operation for modifying the explanation for the example problem was performed (step S5; Yes), the CPU 25 modifies, on the basis of the user operation, the explanatory text for the example problem included in the designated teaching material data 242S (step S6) and proceeds back to step S1 thereafter. In step S6, the user can set an arbitrary portion in the explanatory text as the portion to be modified. In this case, the CPU 25 stores information on the portion to be modified in the example problem modification portion storage table 245.

When it was decided in step S5 that the operation for modifying the explanation for the example problem was not performed (step S5; No), the CPU 25 decides whether or not an operation for designating an exercise as well as an operation for displaying a hint are performed (step S11).

When it was decided in step S11 that the operation for designating an exercise and the operation for displaying a hint was performed (step S11; Yes), the CPU 25 forms a note display window W1 in a display area on the display 210 (refer to FIG. 5A) and decides whether or not an explanatory memo for the exercise that has been designated (hereinafter referred to as the designated exercise) is stored in the added example problem memo storage table 244 (step S12).

When it was decided in step S12 that the explanatory memo for the designated exercise is not stored (step S12; No), the CPU 25 decides whether or not an example problem having a problem similar to the designated exercise, or an added example problem having a problem identical or similar to the designated exercise exists in the designated teaching material data 242S (step S13). More particularly, in step S13, the CPU 25 decides whether or not the example problem having the problem similar to the designated exercise exists in the designated teaching material data 242S by detecting an example problem in the designated teaching material data 242S by using the example problem keyword in the example problem keyword table 243 and comparing the problem of the detected example problem with the designated exercise. Moreover, the CPU 25 decides whether or not the example problem (the added example problem) having the problem identical or similar to the designated exercise exists in the designated teaching material data 242S by detecting the exercise (the added example problem) from the designated teaching material data 242S by using the positional information on the exercise (the added example problem) stored in the added example problem memo storage table 244 and comparing the problem of the detected added example problem with the designated exercise. When the explanatory memo for the designated exercise is not stored (when the designated exercise is not the added example problem) and the added example problem identical to the designated exercise is in the designated teaching material data 242S, this can mean that the identical exercises are respectively provided at the end of a chapter and at the end of a book in the designated teaching material data 242S, where the explanatory memo is stored for one of the exercises, and the other exercise is designated as the designated exercise, for example. It can be decided whether or not the designated exercise and the problem of the example problem (the added example problem) are identical or similar by using a method well known in the related art such as a method in which a character string in both of the designated exercise and the problem of the example problem is recognized by pattern to determine the degree of similarity on the basis of a matching degree of the pattern.

When it was decided in step S13 that the example problem similar to the designated exercise or the added example problem identical or similar to the designated exercise is not in the designated teaching material data 242S (step S13; No), the CPU 25 displays a message indicating that no example problem suitable for reference can be found (step S21).

The CPU 25 then decides whether or not an operation for registering an explanatory memo in the added example problem memo storage table 244 is performed (step S22) and, when it was decided that the operation is not performed (step S22; No), proceeds to another process.

When it was decided in step S22 that the operation for registering the explanatory memo in the added example problem memo storage table 244 was performed (step S22; Yes), the CPU 25 inputs, on the basis of the user operation, a text of the explanatory memo for the designated exercise to the note display window W1 in which the text is displayed (step S23). In step S23, the user can set an arbitrary portion in the text of the explanatory memo as the portion to be modified.

Next, the CPU 25 associates information on the designated exercise with information on the explanatory memo to be stored in the added example problem memo storage table 244 as the information on the problem and the explanation of the added example problem (step S24). The process thereafter proceeds back to step S1. When the portion in the text of the explanatory memo was set as the portion to be modified in step S23, the CPU 25 stores information on the portion to be modified in the example problem modification portion storage table 245 in step S24.

When it was decided in step S13 that the example problem similar to the designated exercise or the added example problem identical or similar to the designated exercise exists in the designated teaching material data 242S (step S13; Yes), the CPU 25 displays a page number and an example problem number of the example problem (hereinafter referred to as a reference example problem) in the designated teaching material data 242S in the note display window W1 (step S31).

The CPU 25 then forms a problem display window W2 in the display area on the display 210 (refer to FIG. 5A), displays the text of the designated exercise in the problem display window W2 (step S32), and performs an example problem difference discriminating and displaying process (step S33).

Figure 4:
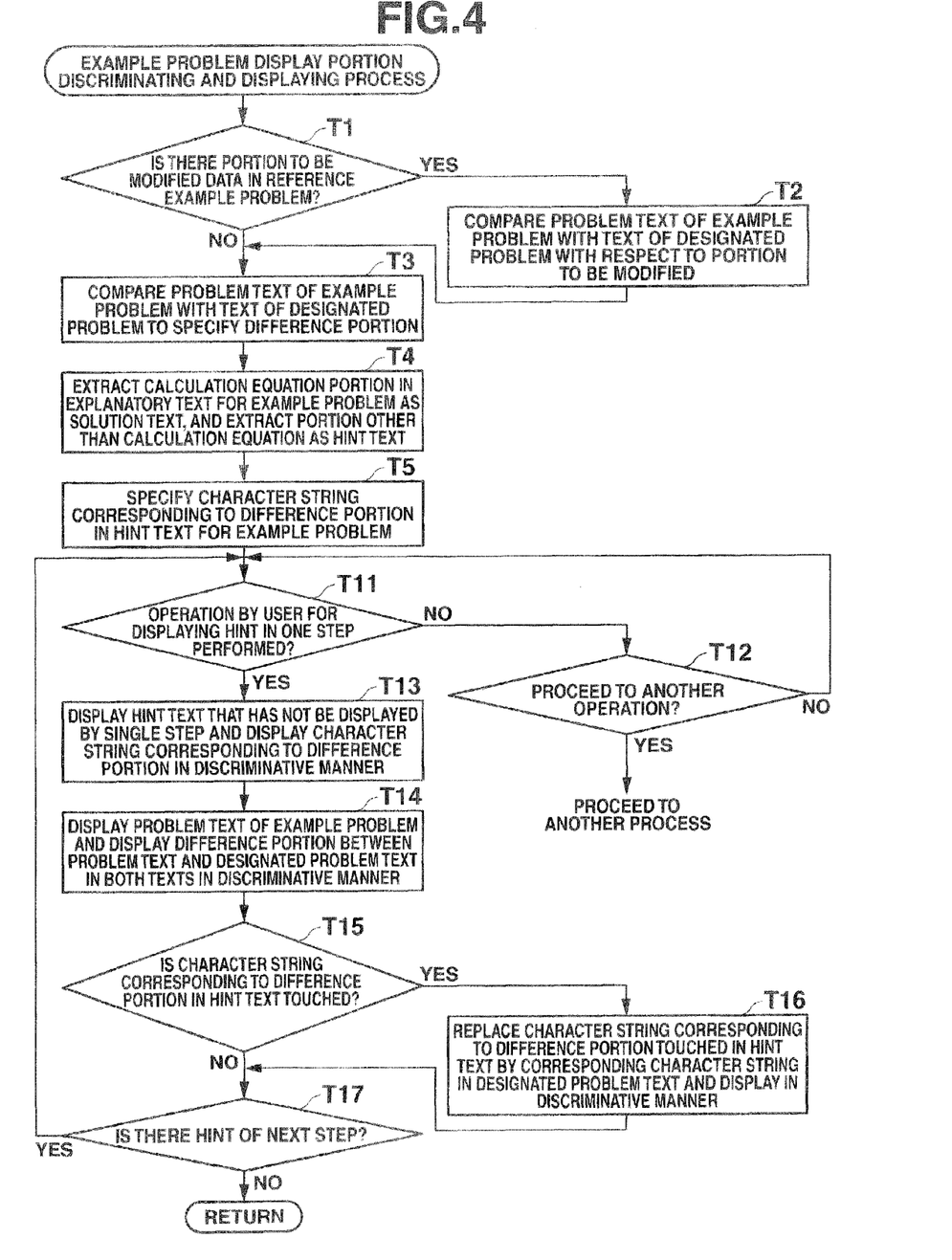
FIG. 4 is a flowchart illustrating a flow of an example problem display portion discriminating and displaying process.

Specifically, as illustrated in FIG. 4, the CPU 25 in the example problem difference discriminating and displaying process first decides whether or not the information on the portion to be modified for the reference example problem is stored in the example problem modification portion storage table 245 (step T1) and, when it was decided that the information is not stored (step T1; No), proceeds to step T3 to be described later.

When it was decided in step T1 that the information on the portion to be modified is stored in the example problem modification portion storage table 245 (step T1; Yes), the CPU 25 compares a portion in the problem text of the reference example problem, the portion corresponding to the portion to be modified, with a portion in the text of the designated exercise, the portion corresponding to the portion to be modified (step T2).

The CPU 25 then compares the problem text of the reference example problem with the text of the designated exercise and specifies a difference portion therebetween (step T3). When it has turned out, as a result of the comparison in step T1, that the portion in the problem text of the reference example problem corresponding to the portion to be modified is different from the portion in the text of the designated exercise corresponding to the portion to be modified, the CPU 25 specifies the portion as the difference portion in step T3.

Next, the CPU 25 extracts a calculation equation portion in the explanatory text for the reference example problem as a text of a final answer and extracts a portion other than the calculation equation as a text of a hint (step T4).

The CPU 25 then specifies, among character strings in the hint text, a character string in the portion corresponding to the difference portion specified in step T3 as a character string corresponding to the difference portion (step T5).

Next, the CPU 25 decides whether or not a user operation for displaying a hint to be given in one step is performed (step T11).

When it was decided in step T11 that the user operation for displaying the hint to be given in one step was not performed (step T11; No), the CPU 25 decides whether or not another operation is performed (step T12).

When it was decided in step T12 that the other operation was performed (step T12; Yes), the CPU 25 proceeds to another process or, when it was decided that the other operation was not performed (step T12; No), proceeds to step T11. When the user has performed an operation for inputting an answer and a calculation equation for the designated exercise in step T12 (step T12; Yes), the CPU 25 may proceed to step T11 after displaying the answer and the calculation equation input according to the user operation in the note display window W1.

When it has been decided in step T11 that the user operation for displaying the hint to be given in one step was performed (step T11; Yes), the CPU 25 displays, among respective steps of the hint text, a single step which is on the forefront side and has not been displayed in the note display window W1 and displays, in a discriminative manner, the character string corresponding to the difference portion in the text of the step (step T13). The hint text will be displayed in order from the forefront side by a single step at a time, by repeating step T13 via step T17 to be described later.

Next, the CPU 25 displays the problem text of the reference example problem in the note display window W1 and displays, in a discriminative manner, the difference portion specified in step T3 between the problem text of the reference example problem and the text of the designated exercise in the respective texts (the problem text in the note display window W1 and the designated exercise text in the problem display window W2) (step T14).

The CPU 25 then decides whether or not a touch operation is performed on the character string corresponding to the difference portion in the hint text (step 115) and, when it was decided that the touch operation was not performed (step T15; No), proceeds to step T17 to be described later.

When it was decided in step 115 that the touch operation was performed on the character string corresponding to the difference portion in the hint text (step T15; Yes), the CPU 25 replaces the character string corresponding to the difference portion touched in the hint text by the character string in the exercise text (the character string corresponding to the character string corresponding to the difference portion which has been touched, among the character strings in the difference portion in the exercise text with respect to the problem text of the reference example problem), and displays the character string in the exercise text in a discriminative manner (step T16).

Next, the CPU 25 decides whether or not there is a hint of a next step is in the explanatory text for the reference example problem (step T17) and, when it was decided that there is a hint is in the explanatory text (step T17; Yes), proceeds to step T11.

When it was decided in step T17 that the hint of the next step is not in the explanatory text for the reference example problem (step T17; No), the CPU 25 proceeds back to step S1 as illustrated in FIG. 3 after completing the example problem difference discriminating and displaying process.

Moreover, when it was decided in step S12 that the explanatory memo for the designated exercise is stored in the added example problem memo storage table 244 (step S12; Yes), the CPU 25 decides the text of the designated exercise to be the problem text of the reference example problem and temporarily stores the explanatory memo for the designated exercise in the storage unit 24 as the explanatory text for the reference example problem (step S41).

The CPU 25 thereafter displays a message to refer to a memo stored in advance for the designated problem, forms the problem display window W2 in the display area on the display 210, displays the text of the designated exercise in the problem display window W2 (step S42), and proceeds to step S33.

Moreover, when it was decided in step S11 that the operation for designating the exercise and the operation for displaying the hint were not performed (step S11; No), the CPU 25 decides whether or not an operation for uploading the designated teaching material data 242S to the education server 100 is performed (step S51).

When it was decided in step S51 that the operation for uploading the designated teaching material data 242S to the education server 100 was performed (step S51; Yes), the CPU 25 uploads to the education server 100 the designated teaching material data 242S including the explanatory text modified in step S6 as well as the information on the designated teaching material data 242S stored in the added example problem memo storage table 244 and the example problem modification portion storage table 245 (such as the text of the explanatory memo input in step S23), so that the information in the education server 100 is updated (step S52). The process thereafter proceeds back to step S1.

When it was decided in step S51 that the operation for uploading the designated teaching material data 242S to the education server 100 was not performed (step S51; No), the CPU 25 decides whether or not another operation is performed (step S61).

When it was decided in step 961 that the other operation was performed (step S61; Yes), the CPU 25 proceeds to another operation and, when it was decided that the other operation was not performed (step S61; No), proceeds back to step S1.

OPERATIONAL EXAMPLE

The operation of the student terminal 1 or the teacher terminal 101 will now be described specifically with reference to the drawings. Note that in the following operational example, a circled number in the drawings will be expressed as [1], [2], and the like. A shaded display portion in a display screen on the display 210 as illustrated in the drawings, which will be referred to in the following operational example, indicates that a character in the shaded area is highlighted. The shaded displays having different appearances indicate that the characters in the respective shaded areas are highlighted in mutually different colors.

Operational Example 1

Figure 5A:
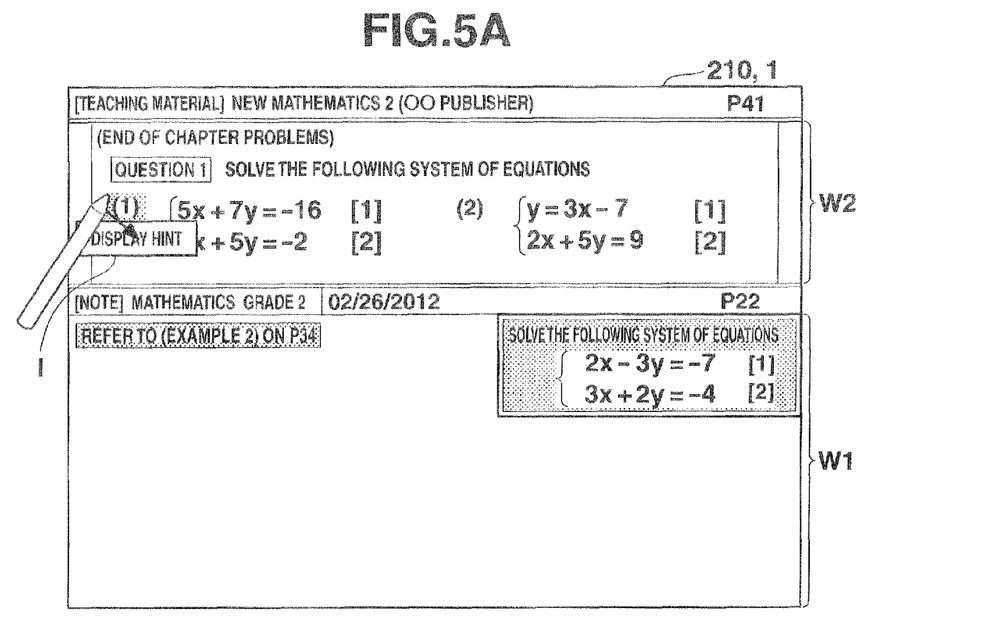
FIGS. 5A and 5B are diagrams illustrating display content on a display.

As Illustrated in FIG. 5A when a student (user) performs an operation for instructing a download of the teaching material data 242 by the student terminal 1 (step S1; Yes) and designates the teaching material data 242 of the teaching material named "new mathematics 2" as the designated teaching material data 2429, the designated teaching material data 242S is downloaded from the education server 100, stored in the storage unit 24, and displayed on the display 210 (step S2).

The designated teaching material data 242S has the content illustrated in FIG. 2. In an operational example, the information on the portion to be modified for an example problem "Example 2 on P34 " (refer to the middle part in FIG. 2) in the designated teaching material data 242S is stored beforehand in the example problem modification portion storage table 245 in the education server 100. More specifically, the portion to be modified which is stored beforehand in the education server 100 is as follows. The explanatory text for the example problem "Example 2 on P34 " is "Approach to the problem: In order to match the coefficient of y in [1] and [2], multiply both sides of [1] by 2, multiply both sides of [2] by 3, add/subtract [1] and [2], and eliminate y. [1]×2 . . . [2]×3 . . . " and the like. The portions to be modified are "2" in the portion "multiply both sides of [1] by 2"; "3" in the portion "multiply both sides of [2] by 3"; "2" in the portion "[1]×2"; "3" in the portion "[2]×3" and the like. When the designated teaching material data 242S is downloaded, the information on the portions to be modified is also downloaded and stored in the example problem modification portion storage table 245 in the student terminal 1.

Next, when the student performs an operation for changing the display position (step S3; Yes), as illustrated in FIG. 5A, the display content of the designated teaching material data 242S is updated by changing the display position (page or line) thereof in response to the operation (step S4). At this point, in the operational example, the display 210 displays a portion "Question 1 on P41 " in the designated teaching material data 242S of the "new mathematics 2".

Next, when the student performs the operation to designate the exercise "Question 1 (1) on P41 ", a hint icon I for displaying a hint is displayed. When the student performs the touch operation on the hint icon I (step S11; Yes), the note display window W1 is formed in the display area on the display 210. And then, it is decided that the explanatory memo for the designated exercise "Question 1 (1) on P41 " is not stored in the added example problem memo storage table 244 (step S12; No) and that the example problem "Example 2 on P34 " having the problem similar to the designated exercise exists in the designated teaching material data 242S (step S13; Yes), whereby the page number "P34 " and the example problem number "Example 2" of the reference example problem "Example 2 on P34 " in the designated teaching material data 242S are highlighted in yellow in the note display window W1 (step S31).

Next, the problem display window W2 is formed in the display area on the display 210 so that the text "5x+7y=−16, . . . " of the designated exercise "Question 1 (1) on P41 " is displayed in the problem display window W2 (step S32).

Next, it is decided that the information on the portions to be modified for the reference example problem "Example 2 on P34 " is stored in the example problem modification portion storage table 245, the portions to be modified including "2" ("2" in the portion "multiply both sides of [1] by 2"), "3" ("3" in the portion "multiply both sides of [2] by 3") and the like (step T1; Yes). Thereafter, the portion in the problem text of the reference example problem, the portion corresponding to the portion to be modified, is compared with the portion in the text of the designated exercise, the portion corresponding to the portion to be modified (step T2), whereby the portions corresponding to the portion to be modified (the coefficient portions of the variable "y" in each equation in the texts, in this case) are specified as the difference portion (step T3).

The calculation equation portion "4x−6y=−14, . . . " (refer to the middle part in FIG. 2) in the explanatory text for the reference example problem is extracted as the text of the final answer, whereas the portion other than the calculation equation "Approach to the problem: In order to match the coefficient of y in [1] and [2] . . . " (the portion surrounded by a two-dot chain line in FIG. 2) is extracted as the text for the hint (step T4).

Next, among the character string in the hint text "Approach to the problem: In order to match the coefficient of y in [1] and [2] . . . ", the character string in the portion corresponding to the difference portion specified in step T3 (the coefficient of the variable "y" in each equation) is specified as the character string corresponding to the difference portion, the portion corresponding to the difference portion including "2" ("2" in the portion "multiply both sides of [1] by 2"), "3" ("3" in the portion "multiply both sides of [2] by 3"), "2" ("2" in the portion "[1]×2") and "3" ("3" in the portion "[2]×3") (step T5).

Figure 5B:
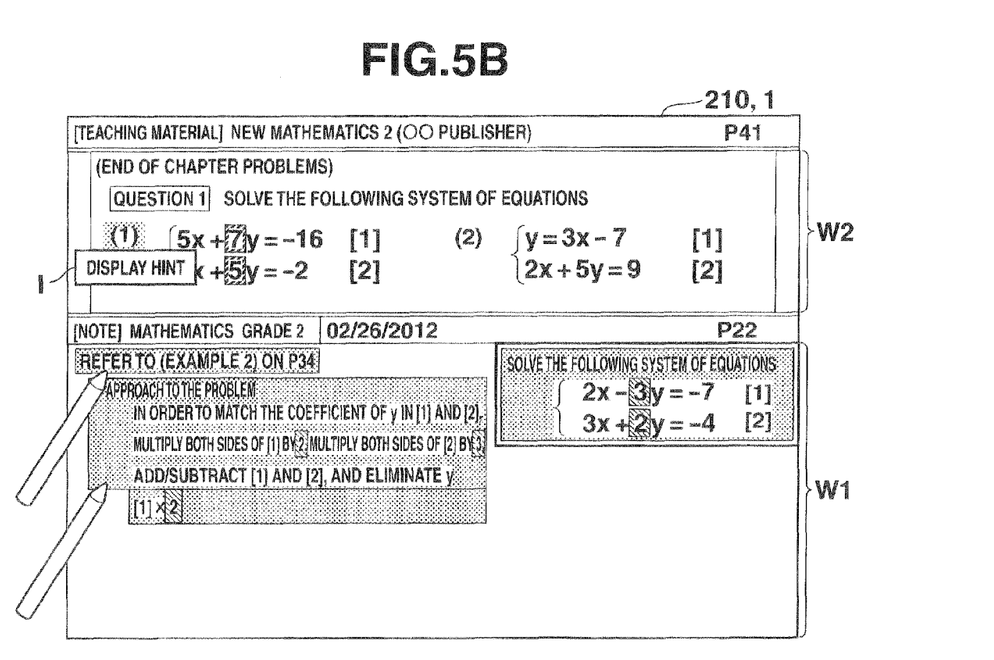

Next, when the operation for displaying the hint to be given in one step (the touch operation performed on the note display window W1 in the operational example) is performed by the student (step T11; Yes), as illustrated in FIG. 5B, one step portion which is on the forefront side and has not been displayed, namely, "Approach to the problem: In order to match the coefficient of y in [1] and [2], multiply both sides of [1] by 2, multiply both sides of [2] by 3, add/subtract [1] and [2], and eliminate y", is highlighted in yellow in the note display window W1, among the respective steps in the hint text "Approach to the problem: In order to match the coefficient of y in [1] and [2] . . . ". Also the character string corresponding to the difference portion in the hint text of the step, namely, "2" ("2" in the portion "multiply both sides of [1] by 2") and "3" ("3" in the portion "multiply both sides of [2] by 3") are highlighted in blue to be displayed in a discriminative manner (step T13).

Next, the problem text of the reference example problem "2x−3y=−7, . . . " is highlighted in yellow in the note display window W1. Also, the difference portion (the coefficient of the variable "y" in each equation) between the problem text: of the reference example problem and the text of the designated exercise is displayed in both of the texts in a discriminative manner, the difference portion being specified in step T3 (step T14). In the operational example, the difference portion (the coefficient of the variable "y") in the problem text with respect to the text of the designated exercise is highlighted in red, whereas the difference portion (the coefficient of the variable "y") in the text of the designated exercise with respect to the problem text is highlighted in blue.

After it was decided that there is a hint of a next step in the explanatory text of the reference example problem "Approach to the problem: In order to match the coefficient of y in [1] and [2] . . . " (step T17; Yes), and when the student performs the operation to display the hint to be given in one step (step T11; Yes), one step portion "[1]×2" which is on the forefront side and has not been displayed among the respective steps in the hint, text "Approach to the problem: In order to match the coefficient of y in [1] and [2] . . . " is highlighted in yellow in the note display window W1. Also the character string "2" corresponding to the difference portion in the hint text "[1]×2" in the one step portion is highlighted in blue to be displayed in a discriminative manner (step T13).

Figure 6A:
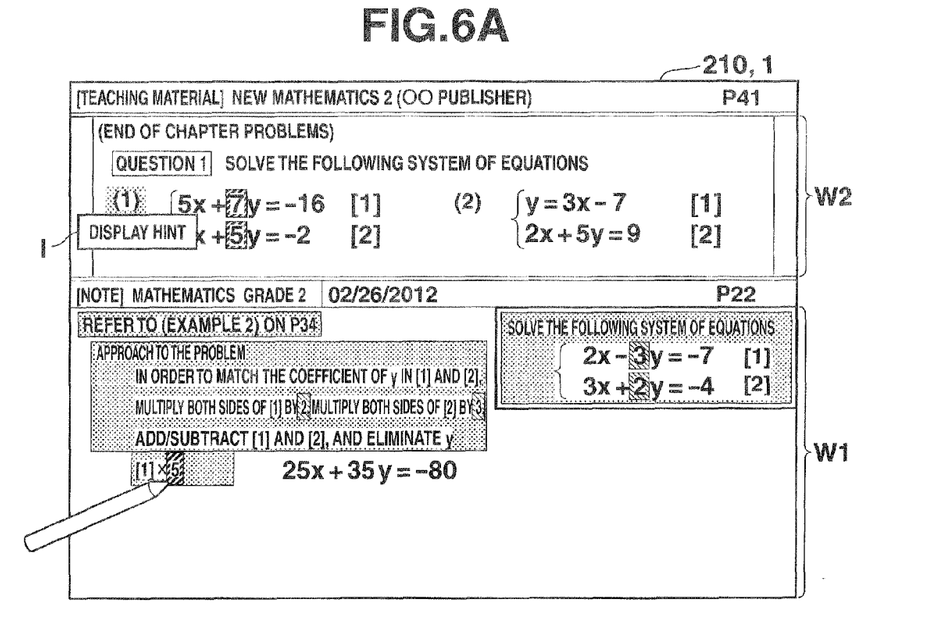
FIGS. 6A and 6B are diagrams illustrating display content on the display.

When the student performs the touch operation on the character string "2" corresponding to the difference portion ("2" in the portion "[1]×2") in the hint text as illustrated in FIG. 6A (step T15; Yes), the touched character string "2" corresponding to the difference portion is replaced by the character string "5" in the exercise text, where the character string "5" is highlighted in red to be displayed in a discriminative manner (step T16).

Next the student performs an operation for inputting the answer and the calculation equation for the designated exercise (step T12; Yes) and has input, a calculation equation "25x+35=−80", the calculation equation is displayed in the note display window W1.

Figure 6B:
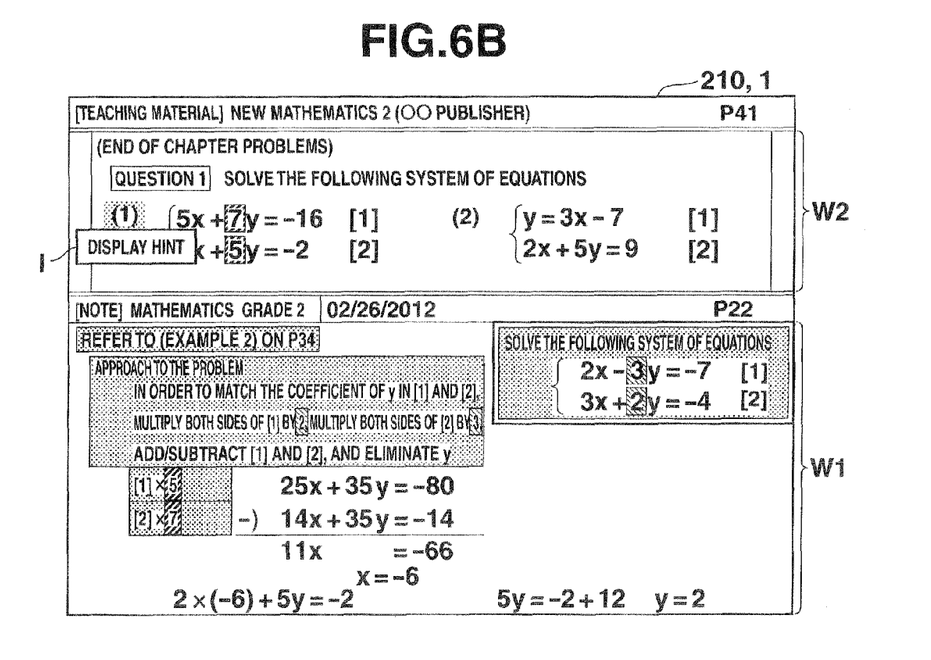

Next, when the student performs an operation for displaying the hint to be given in one step (step T11; Yes), as illustrated in FIG. 6B, one step portion "[2]×3" which on the forefront side and has not been displayed among the respective steps in the hint text "Approach to the problem: In order to match the coefficient, of y in [1] and [2] . . . " is highlighted in yellow in the note display window W1, while the character string "3" corresponding to the difference portion in the hint text "[2]×3" in the one step portion is highlighted in blue to be displayed in a discriminative manner (step T13).

Next, when the student performs the touch operation on the character string "3" corresponding to the difference portion ("3" in the portion "[2]×3") in the hint text (step T15; Yes), the touched character string "3" corresponding to the difference portion is replaced by the character string "7" in the exercise text, where the character string "7" is highlighted in red to be displayed in a discriminative manner (step T16).

The student then performs an operation of inputting the answer and the calculation, equation for the designated exercise (step T12; Yes) and has input the calculation equation and the answer "x=−6" and "y=2", the calculation equation and the answer are displayed in the note display window W1.

Operational Example 2

First, as illustrated in FIG. 7A, when a teacher (user) performs an operation for instructing a download of a teaching material data 242 from the teacher terminal 101 (step S1; Yes) and designates the teaching material data 242 of the teaching material named "new mathematics 2" as the designated teaching material data 242S, the designated teaching material data 242S is downloaded from the education server 100, stored in the storage unit 24, an displayed on the display 210 (step S2).

When the teacher performs an operation for changing the display position (step S3; Yes), the display content of the designated teaching material data 242S is updated by changing the display position (page or line) thereof in response to the operation (step S4). At this point, in the operational example, the display 210 displays a portion "Question 2" in an "End-of-chapter problem" on "P41 " in the designated teaching material data 242S of the "new mathematics 2".

Next, when the teacher performs an operation to designate the exercise "Question 2 (1) on P41 ", the hint icon I for displaying a hint is displayed. When the teacher performs a touch operation on the hint icon I (step S11; Yes), the note display window W1 is formed in the display area on the display 210. Also it is decided that the explanatory memo for the designated exercise "Question 2 (1) on P41 " is not stored in the added example problem memo storage table 244 (step S12; No) and that an example problem similar to the designated exercise or an added example problem identical or similar to the designated exercise does not exist in the designated teaching material data 242S (step S13; No), whereby the message indicating that no example problem suitable for reference can be found is displayed (step S21).

Next, when the teacher performs an operation for registering the explanatory memo in the added example problem memo storage table 244 (step S22; Yes), the text of the explanatory memo "Approach to the problem: Substitute x='0' in the linear equation with two unknowns as follows. 2×0−y=8 Answer: y=−8" for the designated exercise "Question 2 (1) on P41 " is input to the note display window W1 and displayed therein on the basis of the operation by the teacher (step S23). Note that the portion "'0'" in the explanatory memo indicates that the "0" in single quotation marks is the portion to be modified. The single quotation marks "'" and "'" may not be displayed on the display 210.

Next, the information on the designated exercise "Question 2 (1) on P41 " is associated with the information on the text of the explanatory memo "Approach to the problem: Substitute x='0' in the linear equation with two unknowns as follows. 2×0−y=8 Answer: y=−8" to be stored in the added example problem memo storage table 244 as the information on the problem and the explanation of the added example problem (step S24).

When the teacher performs an operation for uploading the designated teaching material data 242S to the education server 100 (step S51; Yes), the information on the designated teaching material data 242S stored in the added example problem memo storage table 244 and the example problem modification portion storage table 245 is uploaded to the education server 100 so that the information in the education server 100 is updated (step S52).

Next, as illustrated in FIG. 7E, when the student (user) performs the operation for instructing the download of the teaching material data 242 from the student terminal 1 (step S1; Yes) and designates the teaching material data 242 of the teaching material named "new mathematics 2" as the designated teaching material data 242S, the designated teaching material data 242S is downloaded from the education server 100, stored in the storage unit 24, and displayed on the display 210 (step S2). Also the information on the designated teaching material data 242S is downloaded from the added example problem memo storage table 244 and the example problem modification portion storage table 245 in the education server 100 and additionally stored in the added example problem memo storage table 244 and the example problem modification portion storage table 245 of the student terminal 1.

Next, when the student performs the operation for changing the display position (step S3; Yes), the display content of the designated teaching material data 242S is updated by changing the display position (page or line) thereof in response to the operation (step S4). At this point, in the operational example, the display 210 displays the portion "Question 2" in the "End-of-chapter problem" on "P41 " in the designated teaching material data 242S of the "new mathematics 2".

Next, when the student performs the operation to designate the exercise "Question 2 (1) on P41 ", the hint icon I for displaying a hint is displayed. When the student performs the touch operation on the hint icon I (step S11; Yes), the note display window W1 is formed in the display area on the display 210. Also it is decided that the text of the explanatory memo "Approach to the problem: Substitute x='0' in the linear equation with two unknowns as follows. 2×0−y=8 Answer: y=−8" for the designated exercise "Question 2 (1) on P41 " is stored in the added example problem memo storage table 244 (step S12; Yes), and the text "x=0 . . . " for the designated exercise "Question 2 (1) on P41 " is decided to be the problem text of the reference example problem, whereby the text of the explanatory memo "Approach to the problem: Substitute x="0" in the linear equation with two unknowns as follows 2×0−y=8 Answer: y=−8" for the designated exercise is decided to be the explanatory text for the reference example problem and temporarily stored in the storage unit 24 (step S41).

Next, the message for referring to the memo stored in advance for the designated problem is displayed. Also the problem display window W2 is formed in the display area on the display 210 so that the text "x=0 . . . " of the designated exercise "Question 2 (1) on P41" is displayed in the problem display window W2 (step S42).

Next, it is decided that the information on the portions to be modified for the reference example problem "Question 2 (1) on P41" is not stored in the example problem modification portion storage table 245 (step T1; No), and the problem text for the reference example problem is compared with the text of the designated exercise to specify the difference portion therebetween (step T3). However, the difference portion will not be specified here since the problem text for the reference example problem is identical to the text of the designated exercise.

Next, the calculation equation portions "2×0−y=8" and "y=−8" in the explanatory text "Approach to the problem: Substitute x='0' in the linear equation with two unknowns as follows. 2×0−y=8 Answer: y=−8" for the reference example problem are extracted as the text of the final answer, whereas the portion other than the calculation equation, namely "Approach to the problem: Substitute x='0' in, the linear equation with two unknowns as follows", is extracted as the text for the hint (step T4).

When the operation for displaying the hint to be given in one step has been performed by the student (step T11; Yes), one step portion "Approach to the problem: Substitute x='0' in the linear equation with two unknowns as follows" which is on the forefront side and has not been displayed among the respective steps in the hint text "Approach to the problem: Substitute x='0' in the linear equation with two unknowns as follows" is highlighted in yellow in the note display window W1 (step T13).

Similar to FIG. 7A, when the student performs the operation for designating the exercise "Question 2 (2) on P41" while "Question 2" in the "End-of-chapter problem" on "P41" in the designated teaching material data 242S of the "new mathematics 2" is displayed on the display 210 of the student terminal 1, as illustrated in FIG. 7C, the hint icon I for displaying the hint is displayed.

Next, when the student performs the touch operation en the hint icon I (step S11; Yes), the note display window W1 is formed in the display area on the display 210. Also it is decided that the text of the explanatory memo for the designated exercise "Question 2 (2) on P41" is not stored in the added example problem memo storage table 244 (step S12; No) and that the added example problem "Question 2 (1) on P41" similar to the designated exercise "Question 2 (2) on P41" is in the designated teaching material data 242S (step S13; Yes), whereby the page number "P41" and the example problem number "Question 2 (1)" of the reference example problem "Question 2 (1) on P41" in the designated teaching material data 242S are highlighted in yellow in the note display window N1 (step 231).

Next, the problem display window W2 is formed in the display area on the display 210 so that the text "x=5, ..." of the designated exercise "Question 2 (2) on P41" is displayed in the problem display window W2 (step S32).

Next, it is decided that the information on the portions to be modified "0" ("0" of the portion "x=0") for the reference example problem "Question 2 (1) on P41" is stored in the example problem modification portion storage table 245 (step T1; Yes). Thereafter, the portion in the problem text of the reference example problem corresponding to the portion to be modified is compared with the portion in the text of the designated exercise corresponding to the portion to be modified (step T2), whereby the portions corresponding to the portion to be modified (the numerical portion on the right side of the equation "x= ..." in the texts, in this case) are specified as the difference portion (step T3).

The calculation equation portion "2×0−y=8" and "y=−8" in the explanatory text "Approach to the problem: Substitute x='0' in the linear equation with two unknowns as follows. 2×0−y=8 Answer: y=−8" for the reference example problem are extracted as the text of the final answer, whereas the portion other than the calculation equation "Approach to the problem: Substitute x='0' in the linear equation with two unknowns as follows" is extracted as the text for the hint (step T4).

Among the character string in the hint text "Approach to the problem: Substitute x='0' in the linear equation with two unknowns as follows", the character string in the portion "0" corresponding to the difference portion (the numerical portion on the right side of the equation "x= ...") specified in step T3 is specified as the character string corresponding to the difference portion (step T5).

Next, when the operation for displaying the hint to be given in one step is performed by the student (step T11; Yes), one step portion "Approach to the problem: Substitute x='0' in the linear equation with two unknowns as follows" which is on the forefront side and has not been displayed among the respective steps in the hint text "Approach to the problem: Substitute x='0' in the linear equation with two unknowns as follows" is highlighted in yellow in the note display window W1. Also the character string "0" corresponding to the difference portion in the hint text of the one step portion is highlighted in blue to be displayed in a discriminative manner (step T13).

Next, the problem text of the reference example problem "x=0, ..." is highlighted in yellow in the note display window W1. Also the difference portion (the numerical portion on the right side of the equation "x= ...") between the problem text of the reference example problem and the text of the designated exercise is displayed in both of the texts in a discriminative manner, the difference portion being specified in step T1 (step T14).

Although not shown, when the student performs the touch operation on the character string "0" corresponding to the difference portion in the hint text (step T15; Yes), the touched character string "0" corresponding to the difference portion is replaced by the character string "5" in the exercise text, where the character string "5" is highlighted in red to be displayed in a discriminative manner (step T16).

According to the above embodiments, as illustrated in steps S13 to S33 in FIG. 3, step T13 in FIG. 4, and FIGS. 5A to 7C, the example problem having the problem similar to the designated exercise is detected as the reference example problem so that the explanation therefor is displayed. Moreover, the portion in the explanation corresponding to the difference portion between the problem of the reference example problem and the designated exercise is displayed in a discriminative manner. As a result, when the problem with no explanation stored is designated as the designated exercise, the explanation for the example problem similar to the designated exercise is displayed so that the portion corresponding to the difference portion between the problem of the example problem and the designated exercise, namely the portion in the explanation for the example problem which should be modified in accordance with the content of the designated exercise for use, is displayed in a discriminative manner. Therefore, even when no explanation is stored for the problem, the explanation for the example problem similar to the problem can be used as reference, whereby a user can solve the problem, for which the explanation is not stored, by referring to the explanation stored for another problem.

As illustrated in step T4 in FIG. 4 and FIGS. 5A and 5B, the explanation is displayed excluding the calculation equation portion included in the explanation for the reference example problem, so that the explanation is displayed excluding the final answer portion in the explanation for the reference example problem, namely, the portion which needs not be referred, to for solving the designated exercise. As a result, the learning effect can be improved as compared to the case where the explanation is displayed more than necessary.

As illustrated in steps T11 to T17 in FIG. 4 and FIGS. 5A to 6E, the explanation for the reference example problem is displayed by portion in order from the forefront side in accordance with the user operation, thereby preventing the explanation portion to which the user needs no reference from being displayed. As a result, the learning effect can be improved as compared to the case where the explanation is displayed more than necessary.

As illustrated in steps S23 and S24 in FIG. 3 and FIGS. 7A to 7C, when the explanation for any one of the exercises is input on the basis of the user operation, the information on the exercise to which the explanation has been input is associated with the information on the explanation to be accumulated and stored in the added example problem memo storage table 244 as the information on the problem and the explanation of the example problem. Also the example problem having the problem identical or similar to the designated exercise is detected as the reference example problem from among the example problems stored in the added example problem memo storage table 244. Therefore, the user can associate in advance the explanation with the exercise with which the explanation is not associated, so that the user can refer to the explanation when solving the problem identical or similar to the exercise.

Details of the structure and the operation of each component in the student terminal 1 in the aforementioned embodiments can certainly be modified as appropriate without departing from the gist of the present invention.

For example, the learning support device according to the present invention was described as the student terminal 1 but can also be applied to electronic equipment in general including a scientific calculator, a mobile phone, a personal computer, a PDA (Personal Digital Assistant), and a game machine. Moreover, the learning program 240 according to the present invention may also be stored in a memory card, a CD or the like which is detachable from the student terminal 1.

The example problem and the exercise included in the teaching material data 242 may also be included in separate data. In this case, the example problem similar to the designated exercise or the added example problem identical or similar to the designated exercise would be retrieved from data on the example problem when performing the process in step S13.

Figure 8:
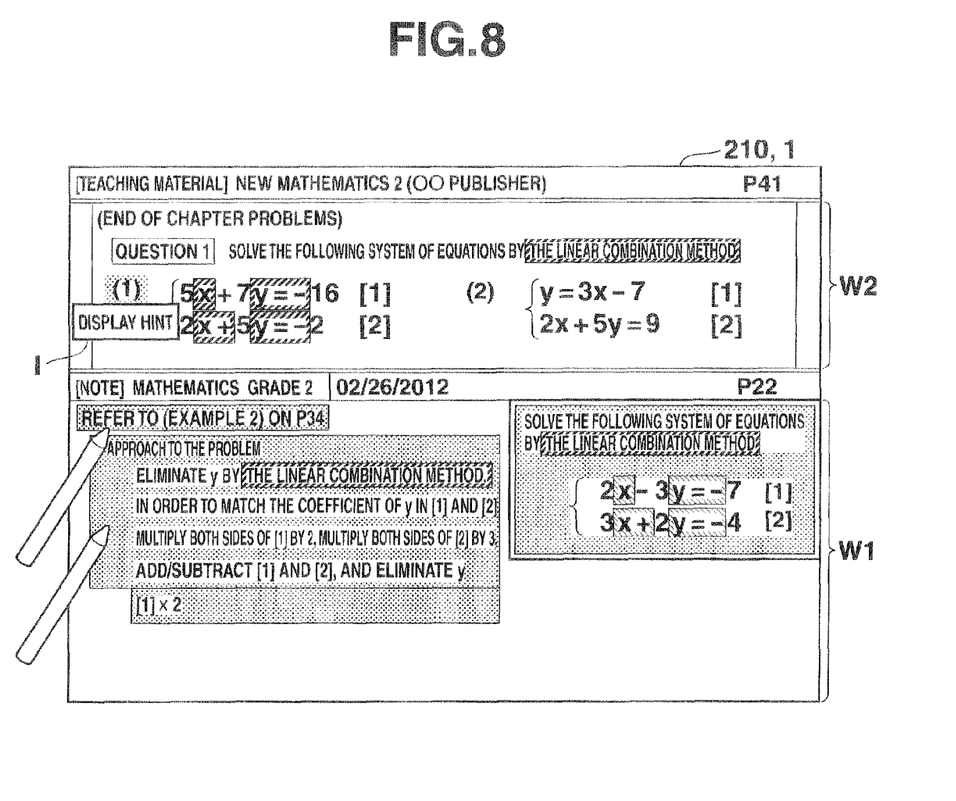
FIG. 8 is a diagram illustrating display content on the display.

It was described herein that, in the explanation for the reference example problem, the portion corresponding to the difference portion between the problem of the reference example problem and the designated exercise is displayed in a discriminative manner. However, in the explanation for the reference example problem, a portion corresponding to an equivalent portion between the problem of the reference example problem and the designated exercise may be displayed in a discriminative manner. In this case, the content illustrated in FIG. 8 in place of the content illustrated in FIG. 5B will be displayed in the "operational example 1", for example. The equivalent portion refers to the portion in which the content and a format (font) correspond, or the content corresponds but the format differs, between the problem of the reference example problem and the designated exercise.

Although several embodiments of the present invention have been described, the scope of the present invention is not limited to the embodiments, but may also include what is described in claims as well as the scope equivalent to the scope of the invention.

What is claimed is:

1. A learning support device comprising:
    an example problem storage unit in which a plurality of example problems, each including a problem and an explanation, are stored;
    an exercise storage unit in which a plurality of exercises are stored;
    an exercise designation unit which designates any one of the plurality of exercises as a designated exercise based on a user's operation;
    a similar example problem judging unit which judges whether or not there is an example problem as a reference example problem having a problem similar to the designated exercise in the example problem storage unit from among the plurality of example problems;
    an example problem corresponding portion discriminating and displaying unit which, when the similar example problem judging unit judges that there is the example problem as the reference example problem having the problem similar to the designated exercise, (i) displays an explanation for the reference example problem, and (ii) displays character strings in the explanation corresponding to a difference portion between the problem of the reference example problem and the designated exercise in a discriminative manner;
    an explanation difference designation unit which designates, based on a user's operation, any one of the character strings in the explanation corresponding to the difference portion between the problem of the reference example problem and the designated exercise; and
    a designated difference replacing and displaying unit which replaces a character string designated by the explanation difference designation unit with a character string that is from the designated exercise and that corresponds to the difference portion, and which displays the replaced character string.

2. The learning support device according to claim 1, wherein the example problem corresponding portion discriminating and displaying unit displays the explanation for the reference example problem excluding a calculation equation portion in the explanation.

3. The learning support device according to claim 1, wherein the example problem corresponding portion discriminating and displaying unit displays, in accordance with a user's operation, the explanation for the reference example problem portion by portion in order from a forefront side of the explanation.

4. The learning support device according to claim 1, further comprising:
    an explanation input unit which inputs an explanation for any one of the exercises based on a user's operation; and
    an added example problem storage unit in which the exercise and the explanation input by the explanation input unit are stored cumulatively and associated with each other as an example problem and an explanation of the example problem,
    wherein the similar example problem judging unit comprises an additional reference example problem detection unit which detects, from example problems stored in the added example problem storage unit, an example problem having a problem identical or similar to the designated exercise as the reference example problem.

5. The learning support device according to claim 4, further comprising a modification portion setting unit which sets, based on a user's operation, an arbitrary portion in the explanation stored in the example problem storage unit as the portion to be modified.

6. A learning support method using a computer, the computer comprising: an example problem storage unit in which a plurality of example problems, each including a problem and an explanation, are stored, and an exercise storage unit in which a plurality of exercises are stored, the method comprising:
- designating any one of the plurality of exercises as a designated exercise based on a user's operation;
- judging whether or not there is an example problem as a reference example problem having a problem similar to the designated exercise in the example problem storage unit from among the plurality of example problems;
- when it is judged that there is the example problem as the reference example problem having the problem similar to the designated exercise, (i) displaying an explanation for the reference example problem, and (ii) displaying character strings in the explanation corresponding to a difference portion between the problem of the reference example problem and the designated exercise in a discriminative manner;
- designating, based on a user's operation, any one of the character strings in the explanation corresponding to the difference portion between the problem of the reference example problem and the designated exercise; and
- replacing a character string, which is designated based on the user's operation, with a character string that is from the designated exercise and that corresponds to the difference portion, and displaying the replaced character string.

7. A non-transitory computer readable program storage medium having stored thereon a program that is executable by a computer which includes: an example problem storage unit in which a plurality of example problems, each including a problem and an explanation, are stored, and an exercise storage unit in which a plurality of exercises are stored, wherein the program causes the computer to perform functions comprising:
- designating any one of the plurality of exercises as a designated exercise based on a user's operation;
- judging whether or not there is an example problem as a reference example problem having a problem similar to the designated exercise in the example problem storage unit from among the plurality of example problems;
- when it is judged that there is the example problem as the reference example problem having the problem similar to the designated exercise,(i) displaying an explanation for the reference example problem, and (ii) displaying character strings in the explanation corresponding to a difference portion between the problem of the reference example problem and the designated exercise in a discriminative manner;
- designating, based on a user's operation, any one of the character strings in the explanation corresponding to the difference portion between the problem of the reference example problem and the designated exercise; and
- replacing a character string, which is designated based on the user's operation, with a character string that is from the designated exercise and that corresponds to the difference portion, and displaying the replaced character string.

* * * * *